United States Patent
Abbas et al.

(10) Patent No.: US 9,850,421 B2
(45) Date of Patent: Dec. 26, 2017

(54) USE OF CARBON DIOXIDE SOLUBLE NONIONIC SURFACTANTS FOR ENHANCED CRUDE OIL RECOVERY

(71) Applicant: DOW GLOBAL TECHNOLOGIES LLC, Midland, MI (US)

(72) Inventors: Sayeed Abbas, Pearland, TX (US); Aaron W. Sanders, Missouri City, TX (US); Debashis Chakraborty, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 368 days.

(21) Appl. No.: 14/343,905

(22) PCT Filed: Sep. 20, 2012

(86) PCT No.: PCT/US2012/056279
§ 371 (c)(1),
(2) Date: Mar. 10, 2014

(87) PCT Pub. No.: WO2013/043838
PCT Pub. Date: Mar. 28, 2013

(65) Prior Publication Data
US 2014/0224484 A1 Aug. 14, 2014

Related U.S. Application Data

(60) Provisional application No. 61/538,477, filed on Sep. 23, 2011.

(51) Int. Cl.
*C09K 8/584* (2006.01)
*C09K 8/594* (2006.01)
(Continued)

(52) U.S. Cl.
CPC .......... *C09K 8/584* (2013.01); *C08G 65/2624* (2013.01); *C09K 8/594* (2013.01); *E21B 43/16* (2013.01); *E21B 43/164* (2013.01)

(58) Field of Classification Search
CPC .... C09K 8/594; C09K 8/584; C08G 65/2624; E21B 43/16; E21B 43/164
See application file for complete search history.

(56) References Cited

U.S. PATENT DOCUMENTS 2,871,266 A * 1/1959 Riley ................. C08G 65/2624
                                                          252/390
3,117,999 A * 1/1964 Boettner ............ B01D 19/0404
                                                          192/99 B
(Continued)

FOREIGN PATENT DOCUMENTS

| GB | 2125058 | 2/1984 |
| WO | 03062520 | 7/2003 |

(Continued)

OTHER PUBLICATIONS

Global CCS Institute, 2.2 Liquid carbon dioxide, 8 pages, printed Mar. 22, 2017.*

*Primary Examiner* — Alicia Bland
(74) *Attorney, Agent, or Firm* — Brooks, Cameron & Huebsch, PLLC (57) ABSTRACT

The present disclosure includes a nonionic surfactant and a method of providing the nonionic surfactant, where the nonionic surfactant is soluble in carbon dioxide and is used as part of a dispersion for enhanced crude oil recovery. The nonionic surfactant can be part of an emulsion that includes carbon dioxide and a diluent.

16 Claims, 2 Drawing Sheets

(51) Int. Cl.
   *C08G 65/26* (2006.01)
   *E21B 43/16* (2006.01)

(56) References Cited

U.S. PATENT DOCUMENTS

| | | | |
|---|---|---|---|
| 3,342,256 A | | 9/1967 | Bernard et al. |
| 4,605,773 A | | 8/1986 | Maloney et al. |
| 4,945,989 A | * | 8/1990 | Irani .................. C09K 8/594 166/268 |
| 5,358,046 A | * | 10/1994 | Sydansk ................ B09C 1/00 166/270.1 |
| 5,641,887 A | | 6/1997 | Beckman et al. |
| 6,562,605 B1 | | 5/2003 | Beckman et al. |
| 6,686,438 B1 | | 2/2004 | Beckman et al. |
| 8,695,718 B2 | | 4/2014 | Sanders et al. |

FOREIGN PATENT DOCUMENTS

| | | |
|---|---|---|
| WO | 2010044618 | 4/2010 |
| WO | 2011005246 | 1/2011 |

\* cited by examiner

USE OF CARBON DIOXIDE SOLUBLE NONIONIC SURFACTANTS FOR ENHANCED CRUDE OIL RECOVERY

This application is a National Stage Application under 35 U.S.C. §371 of International Application Number PCT/US2012/056279, filed Sep. 20, 2012 and published as WO 2013/043838 on Mar. 28, 2013, which claims the benefit to U.S. Provisional Application 61/538,477, filed Sep. 23, 2011, the entire contents of which are incorporated herein by reference in its entirety.

FIELD OF DISCLOSURE

Embodiments of the present disclosure are directed towards enhanced crude oil recovery; more specifically, embodiments are directed towards the use of carbon dioxide soluble nonionic surfactants for enhanced crude oil recovery.

BACKGROUND

A variety of techniques have been used to enhance the recovery of hydrocarbons from subterranean formations in which the hydrocarbons no longer flow by natural forces. Such techniques can include water injection and/or subsequent miscible carbon dioxide flooding, among others. Water injection can be useful to recover some hydrocarbons, however, only about a third of the hydrocarbons are recovered using this technique. As such, typically water injection procedures are followed by miscible carbon dioxide flooding procedures. Miscible carbon dioxide flooding can be performed with a miscible gas, to reduce the viscosity of the crude oil present in the subterranean formation in order to increase the flow of hydrocarbons to a production well. Carbon dioxide, which acts as a solvent to reduce the viscosity of the crude oil, is one of the most effective, and least expensive, miscible gases. During the miscible carbon dioxide flooding procedure the carbon dioxide is in the liquid and/or supercritical phase.

Miscible carbon dioxide flooding, however, can be accompanied with a number of drawbacks. One main problem encountered is poor sweep of the subterranean formation. Poor sweep occurs when the gas injected into the reservoir during a miscible carbon dioxide flooding process flows through the paths of least resistance due to the low viscosity of the gas, thus bypassing significant portions of the formation. When the gas bypasses significant portions of the formation, less crude oil is contacted with the gas, reducing the likelihood that the gas will reduce the viscosity of the crude oil. Thus, the gas injected during the miscible carbon dioxide flooding process is meant to "sweep" the crude oil toward the production well by lowering the viscosity of the crude oil. However, when the gas does not contact a large portion of the crude oil contained in the subterranean formation, a large portion of the crude oil in the subterranean formation is left behind, producing poor sweep. In addition, due to the low density of the gas, the injected gas can rise to the top of the formation and "override" portions of the formation, leading to early breakthrough of the gas at the production well, leaving less gas within the subterranean formation to contact with the crude oil, again reducing the likelihood that the gas will reduce the viscosity of the crude oil.

To enhance the effectiveness of the miscible carbon dioxide flooding process it has been suggested that a foaming agent or a surfactant be included in the process to help to generate a dispersion in the formation. A dispersion can generate an apparent viscosity of about 100 to about 1,000 times that of the injected gas, therefore, the dispersion can inhibit the flow of the gas into that portion of the subterranean formation that has previously been swept. In other words, the dispersion can serve to block the volumes of the subterranean formation through which the gas can short-cut, thereby reducing its tendency to channel through highly permeable fissures, cracks, or strata, and directing it toward previously unswept portions of the subterranean formation. As such, the dispersion can force the gas to drive the recoverable hydrocarbons from the less depleted portions of the reservoir toward the production well.

Another problem encountered by prior art surfactants has been the selection of anionic surfactants that have a high affinity to formation rock within the reservoir, for example, carbonate. Surfactants with a high affinity to formation rock can adsorb into the formation rock, leading to surfactant loss. Without the surfactant present, there is less likelihood of forming a dispersion within the reservoir, also leading to early breakthrough and poor sweep, as discussed herein.

SUMMARY

Embodiments of the present disclosure include a dispersion for enhanced crude oil recovery and a method of using the dispersion for recovering crude oil from a subterranean formation in an enhanced oil recovery operation. The dispersion for enhanced crude oil recovery includes carbon dioxide ($CO_2$) in a liquid or a super critical state; a diluent; and a nonionic surfactant provided by an alkoxylation reaction of a first epoxide, a second epoxide different than the first epoxide, and a primary aliphatic amine covalently linked to a tertiary carbon of a C4 (four carbon atom) to C30 (thirty carbon atom) branched alkyl monoamine, where the nonionic surfactant promotes a formation of the dispersion formed of carbon dioxide and the diluent.

The alkoxylation reaction used to provide the nonionic surfactant has the first epoxide selected from the group consisting of propylene oxide, butylene oxide, 1-hexene oxide, 2-hexene oxide, 1-octene oxide and isobutylene oxide. The second epoxide is ethylene oxide. In one embodiment, the first epoxide is propylene oxide and the second epoxide is ethylene oxide. The branched alkyl monoamine can be PRIMENE™ TOA. The branched alkyl monoamine can be PRIMENE™ 81-R.

The nonionic surfactant of the present disclosure can have propylene oxide as the first epoxide, where the alkoxylation reaction can have a molar ratio of propylene oxide to branched alkyl monoamine in a range of 1.5:1.0 moles to 10:1.0 moles. The nonionic surfactant of the present disclosure can have ethylene oxide as the second epoxide, where the alkoxylation reaction has a molar ratio of ethylene oxide to branched alkyl monoamine in a range of 3.0:1.0 moles to 40.0:1.0 moles. Another molar ratio includes where the alkoxylation reaction uses a molar ratio of ethylene oxide to branched alkyl monoamine of 12.0:1.0 moles. Yet another molar ratio includes where the alkoxylation reaction uses a molar ratio of ethylene oxide to branched alkyl monoamine of 16.0:1.0 moles.

The method for recovering crude oil from the subterranean formation, penetrated by at least one injection well and one production well, can include forming a dispersion of carbon dioxide and a diluent in the subterranean formation with the nonionic surfactant provided by the alkoxylation reaction of the first epoxide, the second epoxide different than the first epoxide, and the primary aliphatic amine covalently linked to a tertiary carbon of a C4 to C30 branched alkyl monoamine; and recovering crude oil from the subterranean formation from a production well. The method can include allowing the carbon dioxide in the dispersion to dissolve into the crude oil in the subterranean formation to provide a lowered viscosity of the crude oil; and recovering the crude oil having the lowered viscosity from the subterranean formation.

The dispersion can be formed by a number of different techniques. For example, the nonionic surfactant can be injected with the diluent into the subterranean formation via the injection well. Injecting the nonionic surfactant with the diluent into the subterranean formation can include injecting carbon dioxide into the subterranean formation after injecting the nonionic surfactant with the diluent into the subterranean formation. It is also possible to inject the diluent into the subterranean formation followed by injecting the surfactant dissolved in the carbon dioxide into the subterranean formation so as to form the dispersion.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Definitions

As used herein, "a," "an," "the," "at least one," and "one or more" are used interchangeably. The terms "comprises," "includes" and variations of these words do not have a limiting meaning where these terms appear in the description and claims. Thus, for example, a dispersion that comprises "a" nonionic surfactant can be interpreted to mean a dispersion that includes "one or more" nonionic surfactants. In addition, the term "comprising," which is synonymous with "including" or "containing," is inclusive, open-ended, and does not exclude additional unrecited elements or method steps.

As used herein, the term "and/or" means one, more than one, or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "diluent" can include, for example, water, brine, connate water, surface water, distilled water, carbonated water, sea water and combinations thereof. For brevity, the word "diluent" will be used herein, where it is understood that one or more of "water," "brine," "connate water," "surface water," "distilled water," "carbonated water," and/or "sea water" can be used interchangeably.

As used herein, a "surfactant" refers to a chemical compound that lowers the interfacial tension between two liquids.

As used herein, a "dispersion" refers to a system in which particles of any nature (e.g. solid, liquid or gas) are dispersed in a continuous phase of a different composition (or state). Examples of a dispersion can include an emulsion and a foam.

As used herein, an "emulsion" refers to a mixture of two immiscible liquids, where one liquid (the dispersed phase) is dispersed in the other (the continuous phase).

As used herein, a "foam" refers to a dispersion of a gas, liquid, or supercritical fluid (where the phase may change depending on the conditions in the process) in a liquid.

As used herein, a "nonionic surfactant" refers to a surfactant where the molecules forming the surfactant are uncharged.

As used herein, "crude oil" refers to a naturally occurring, inflammable liquid consisting of a complex mixture of hydrocarbons of various molecular weights and other liquid organic compounds that are found in subterranean formations beneath the Earth's surface.

As used herein, a "supercritical phase" means a dense gas that is maintained above its critical temperature (the temperature above which it cannot be liquefied by pressure).

As used herein, a "cloud point" of a solution that includes the nonionic surfactant of the present disclosure is the temperature at which the nonionic surfactant is no longer completely soluble, precipitating as a second phase giving the solution a cloudy appearance.

DETAILED DESCRIPTION

Embodiments of the present disclosure include a dispersion for enhanced crude oil recovery, where the dispersion includes carbon dioxide ($CO_2$) in a liquid or super critical state, a diluent and a nonionic surfactant provided by an alkoxylation reaction of a first epoxide, a second epoxide different than the first epoxide, and a primary aliphatic amine covalently linked to a tertiary carbon of a C4 to C30 branched alkyl monoamine. The nonionic surfactant promotes a formation of the dispersion of the carbon dioxide, the diluent and the nonionic surfactant. Embodiments of the present disclosure also include a method for recovering crude oil from a subterranean formation that is penetrated by at least one injection well and one production well. The method includes forming the dispersion of carbon dioxide and the diluent in the subterranean formation with the nonionic surfactant, and recovering crude oil from the subterranean formation from a production well.

Carbon dioxide is a poor solvent and, in general, only expensive nonionic surfactants containing such elements as fluorine and/or silicon are soluble in it. Unlike these expensive nonionic surfactants, the nonionic surfactant of the present disclosure is formed from a primary aliphatic amine in which the amino nitrogen atom is covalently linked to a tertiary carbon of a C4 to C30 branched alkyl monoamine. The nonionic surfactant is surprisingly soluble in carbon dioxide and is relatively inexpensive to form compared to surfactants containing such elements as fluorine and/or silicon.

As discussed herein, an issue in enhanced crude oil recovery is that carbon dioxide injected directly into an underground formation has a low viscosity, as a result of which it channels through high permeability zones in an oil reservoir and leaves much of the oil behind. So, instead of spreading out through the underground formation, the carbon dioxide finds the fastest way through the formation. If, however, the carbon dioxide were made to behave in a more viscous manner it could be made to spread out and slow down thereby contacting more of the underground formation. This would lead to more contact of the carbon dioxide with the crude oil in the underground formation. To address this problem, the nonionic surfactant of the present disclosure helps to form a dispersion of the carbon dioxide and the diluent. It is appreciated that the carbon dioxide used in enhanced crude oil recovery processes may be in any one or more of a liquid phase, a gas phase and/or a supercritical phase. As such, the dispersion created with the nonionic surfactant, the diluent and the carbon dioxide may also be a foam and/or an emulsion. For ease of reading, the term "dispersion" will be used in the present disclosure for consistency, but it is understood that at various points during its use the carbon dioxide can be in different phases (e.g., liquid, gas, supercritical) therefore the exact form of the dispersion could be as a foam or could be as an emulsion or something in between.

When formed in the underground formation, the dispersion helps to increase the residence time of the carbon dioxide and to spread the carbon dioxide through the underground formation. Once in contact with the crude oil, the carbon dioxide can absorb into the crude oil making it less viscous, among other desirable properties. The structure of the nonionic surfactant helps to lower the interfacial tension between the carbon dioxide and the diluent, which helps in creating the dispersion. The nonionic surfactant of the present disclosure provides a hydrophilic portion (e.g., a water soluble component) and a $CO_2$-philic portion (e.g., a carbon dioxide soluble component).

The nonionic surfactant of the present disclosure is derived by alkoxylating a primary aliphatic amine covalently linked to a tertiary carbon of a C4 to C30 branched alkyl monoamine with a first epoxide and a second epoxide different than the first epoxide. The second epoxide used in forming the nonionic surfactant provides for the hydrophilic portion, while the branched alkyl of the monoamine provides for the $CO_2$-philic portion of the nonionic surfactant. The first epoxide provides for both hydrophilic and CO2-philic portions of the nonionic surfactant. To modify the $CO_2$-philic portion, changes in the low molecular weight highly branched hydrophobe and/or the first epoxide can be made. To modify the hydrophilic portion, modifying the type and/or amount of either the first epoxide and/or the second epoxide added to the nonionic surfactant can be made.

For the surfactant to be soluble in carbon dioxide (e.g., $CO_2$-philic) it is preferred that the alkyl monoamine be branched, where being branched means the presence of at least one branch (i.e., an oligomeric offshoot from a main chain) in the alkyl chain. While not wishing to be bound by theory, the presence of the branch in the alkyl chain is believed to lower the interaction of the nonionic surfactant with each other (e.g., preventing them from packing together) allowing the surfactant to be better solvated by CO2.

As discussed herein, embodiments of the present disclosure utilize branched alkyl monoamines. Specific examples of such branched alkyl monoamines include, but are not limited to, tertiary butylamine and the "PRIMENE™ AMINES" (The Dow Chemical Company). These PRIMENE™ AMINES are tertiary alkyl primary amines in which the amino nitrogen atom is linked to a tertiary carbon. These compounds are sold under the trade designator of PRIMENE™ TOA (a branched C8 tertiary alkyl primary amine), PRIMENE™ JM-T (a mixture of branched C16 to C22 tertiary alkyl primary amine isomers), PRIMENE™ MD (methanediamine (1,8-diamino-p-methane), and PRIMENE™ 81-R (a mixture of branched C12 to C14 tertiary alkyl primary amine isomers). The choice of the number of carbon atoms used in the branched structure can be selected based on the end use of the dispersion, especially the temperature and/or pressure of the subterranean formation in which the dispersion will be used.

For the various embodiments, providing the nonionic surfactant can include an alkoxylation reaction. It is understood by those skilled in the art that amine alkoxylations can be carried out using several methods, such as described in U.S. Pat. Nos. 2,871,266 and 3,117,999. In certain instances of this embodiment the alkoxylation reaction can consist of three stages. The first stage and second stage of the alkoxylation reaction includes alkoxylating the primary aliphatic amine covalently linked to the tertiary carbon of the branched alkyl monoamine with the first epoxide to provide an intermediate compound. The third stage includes alkoxylating the intermediate compound with the second epoxide, different than the first epoxide, to form the nonionic surfactant. So, for example, in the first and second stages of the alkoxylation reaction the first epoxide can be added to the primary aliphatic amine in a blockwise fashion (as compared to a random fashion), followed by a blockwise addition of the second epoxide. In other words, alkoxylating the primary aliphatic amine covalently linked to the tertiary carbon of the branched alkyl monoamine with the first epoxide forms a first homopolymer subunit (e.g., a first block) covalently attached to the primary aliphatic amine. This intermediate compound can then be alkoxylated with the second epoxide (a different epoxide structure than the first epoxide) to form a second homopolymer subunit (e.g., a second block) on the intermediate compound thereby forming the nonionic surfactant of the present disclosure.

For the various embodiments, providing the nonionic surfactant can include an alkoxylation reaction in three stages. Acidic catalysis, KOH catalysis, NaOH, or auto catalysis can be used for the alkoxylation reaction. In the first stage of the alkoxylation reaction, the branched alkyl monoamine and the first epoxide are introduced into a reactor system and reacted under inert conditions (e.g., a nitrogen atmosphere) and in a molar ratio of 1:1. The primary aliphatic amine covalently linked to the tertiary carbon of the branched alkyl monoamine reacts with one equivalent mole of the first epoxide to form a monoalkoxylate intermediate compound.

In the second stage, the remaining moles of the first epoxide are added into the reaction mixture along with a catalyst. Acidic catalysis, KOH catalysis or NaOH catalysis can be used for the alkoxylation reaction. The monoalkoxylate intermediate compound is further alkoxylated with the first epoxide under inert conditions to form the alkoxylate of the primary aliphatic amine.

The second epoxide is added to the reactor system during the third stage of the alkoxylation reaction, where the second epoxide, different than the first epoxide, reacts with alkoxylate of the primary aliphatic amine in the presence of the catalyst and under the inert conditions to form the nonionic surfactant. The same catalyst can be present in each of the alkoxylation reactions. If desired, additional catalyst can be added during the alkoxylation reaction.

In the alkoxylation reaction the first epoxide can be added to the primary aliphatic amine in a blockwise fashion (as compared to a random fashion), followed by a blockwise addition of the second epoxide. In other words, alkoxylating the primary aliphatic amine covalently linked to the tertiary carbon of the branched alkyl monoamine with the first epoxide forms a first homopolymer subunit (e.g., a first block) covalently attached to the primary aliphatic amine. This intermediate compound can then be alkoxylated with the second epoxide (a different epoxide structure than the first epoxide) to form a second homopolymer subunit (e.g., a second block) on the intermediate compound thereby forming the nonionic surfactant of the present disclosure.

Reaction times for each step of the alkoxylation reaction can depend upon the degree of alkoxylation desired as well as upon the rate of the alkoxylation reaction (which is, in turn, dependent upon temperature, pressure, catalyst quantity and nature of the reactants). Examples of suitable reaction conditions the processes can be found in U.S. Pat. Nos. 2,871,266 and 3,117,999, both of which are incorporated herein by reference in their entirety.

For the present disclosure, the first epoxide can be selected from the group consisting of propylene oxide, butylene oxide, 1-hexene oxide, 2-hexene oxide, 1-octene oxide and isobutylene oxide. The second epoxide is preferably ethylene oxide. As discussed, the second epoxide is different than the first epoxide in forming the nonionic surfactant of the present disclosure.

In an additional embodiment, the first epoxide is propylene oxide and the second epoxide is ethylene oxide. For this embodiment, the first and second stages of the alkoxylation reaction add the propylene oxide to the primary aliphatic amine and the third stage of the alkoxylation reaction adds the ethylene oxide to provide the nonionic surfactant. For example, during the first and second stages when the first epoxide is propylene oxide the alkoxylation reaction can have a molar ratio of propylene oxide to the branched alkyl monoamine in a range of 1.5:1.0 moles to 10:1.0 moles. Preferably, during the first and second stages when the first epoxide is propylene oxide the alkoxylation reaction can have a molar ratio of propylene oxide to the branched alkyl monoamine in a range of 3:1.0 moles to 7:1.0 moles. During the third stage when the second epoxide is ethylene oxide the alkoxylation reaction can have a molar ratio of ethylene oxide to branched alkyl monoamine in a range of 3.0:1.0 moles to 40.0:1.0 moles. Preferably, during the third stage when the second epoxide is ethylene oxide the alkoxylation reaction can have a molar ratio of ethylene oxide to branched alkyl monoamine in a range of 8:1.0 moles to 25:1.0 moles. Specific examples of this third stage of the alkoxylation reaction include using a molar ratio of ethylene oxide to branched alkyl monoamine of 12.0:1.0 moles or using a molar ratio of ethylene oxide to branched alkyl monoamine of 16.0:1.0 moles.

For the various embodiments, the nonionic surfactant of the present disclosure can have a cloud point in a range of about the temperature of the subterranean formation to about 30° C. above a temperature of the subterranean formation in which the dispersion is to be used. In some embodiments, selecting the nonionic surfactant of the present disclosure includes selecting the surfactant with a cloud point in a range of about 10 to about 20° C. above the temperature of the subterranean formation in which the dispersion is to be used.

Embodiments of the present disclosure include a method for recovering crude oil from a subterranean formation penetrated by at least one injection well and one production well. For the various embodiments, the nonionic surfactant is injected with the carbon dioxide and/or the diluent into the subterranean formation via the injection well to generate the dispersion. For example, the nonionic surfactant can be injected with the diluent into the subterranean formation via the injection well followed by injecting the carbon dioxide into the subterranean formation (i.e., the carbon dioxide is injected after the nonionic surfactant with the diluent is injected into the subterranean formation) to generate the dispersion. This process is termed a surfactant-alternating-gas (SAG) process.

In an alternative example, the nonionic surfactant can be injected with carbon dioxide into the subterranean formation to generate the dispersion, where the subterranean formation contains the diluent. For example, the diluent is first injected into the subterranean formation followed by injecting the surfactant dissolved in the carbon dioxide into the subterranean formation. In addition, in some embodiments, the nonionic surfactant can be injected into the reservoir with both the diluent and carbon dioxide to generate the dispersion, where the nonionic surfactant can be included in either the carbon dioxide and/or the diluent. The dispersion can also be generated before being injected into the subterranean formation by stirring the diluent and the nonionic surfactant and injecting it into the reservoir. Other methods of forming dispersion within a subterranean formation are described in U.S. Pat. No. 4,380,266, which is incorporated herein by reference. For each of the techniques discussed herein it is also possible to include an intermediate injection(s) of the nonionic surfactant in either the carbon dioxide or diluent into the subterranean formation during the described technique.

For the various embodiments, the nonionic surfactant, as described herein, can be included in an amount of at least 0.01 weight percent when dissolved directly in the carbon dioxide phase based on the weight of the carbon dioxide. In an additional embodiment, the nonionic surfactant of the present disclosure can be present in an amount of at least 0.05 weight percent when dissolved directly in the carbon dioxide phase based on the weight of the carbon dioxide. In another embodiment, the nonionic surfactant can be present in an amount of at least 0.5 weight percent when dissolved directly in the diluent phase based on the weight of the diluent. In an additional embodiment, the nonionic surfactant can be present in an amount of at least 1.0 weight percent when dissolved directly in the diluent phase based on the weight of the diluent. In addition, the nonionic surfactant can be included in the dispersion of the present disclosure in a range of 0.03 to 5.0 weight percent based on the total weight of the composition used to create the dispersion. In another embodiment, the nonionic surfactant can be included in the compositions of the present disclosure in a range of 0.05 to 2.0 weight percent based on the total weight of the composition used to create the dispersion. Other ranges are possible.

For the various embodiments, the carbon dioxide can be in a liquid or supercritical phase. As appreciated by one skilled in the art, carbon dioxide is in a liquid phase when subjected to a pressure of about 1,000 pounds per square inch (psi) and a temperature below 31 degrees Celsius (° C.). In addition, the carbon dioxide can transition to a supercritical phase when, at a pressure of about 1,000 psi, the temperature rises above 31° C. In embodiments of the present disclosure, the carbon dioxide injected into the subterranean formation can be transferred through a pipeline where the pressure is about 2,000 psi and temperature ranges from about 25 to about 70° C. As such, the carbon dioxide can vacillate between a supercritical phase and a liquid phase, however, for embodiments of the present disclosure the carbon dioxide is described as behaving as a liquid.

The carbon dioxide is a noncondensable gas (e.g., a gas that is not easily condensed by cooling) in the dispersion. As appreciated by one skilled in the art, for a given crude oil temperature, the noncondensable gas can become miscible with crude oil above a pressure known as the minimum miscibility pressure. With enhanced recovery processes which employ noncondensable gases under miscible conditions the crude oil can be caused to flow toward a producing well because the noncondensable gas acts as a solvent, thus substantially dissolving, or "swelling" the crude oil (e.g., increases the volume of the crude oil by dissolving into the crude oil) to reduce the viscosity of the crude oil (e.g., provide a lowered viscosity of the crude oil). As used herein "dissolving" into the crude oil refers to the process where the carbon dioxide in the dispersion passes into solution with the crude oil. Since the carbon dioxide has a low viscosity relative to the crude oil, the viscosity of the crude oil will decrease as the carbon dioxide dissolves into the crude oil. In addition, viscosity is a measure of a fluid's resistance to flow. Therefore, by allowing the carbon dioxide in the dispersion to dissolve into the crude oil in the subterranean formation to provide a lowered viscosity of the crude oil, the crude oil will flow more readily than if the carbon dioxide had not dissolved into the crude oil. By reducing the viscosity, the crude oil can flow into a production well linked to the subterranean formation for recovery of the crude oil. In other words, the crude oil, having the lowered viscosity, can be recovered from the subterranean formation from the production well.

Although embodiments described herein include carbon dioxide as the noncondensable gas in compositions of the present disclosure, one skilled in the art will appreciate that other noncondensable gases may also be included in place of carbon dioxide and/or in addition to carbon dioxide. Examples of other possible noncondensable gases include, but are not limited to, nitrogen, natural gas, methane, propane, butane, ethane, ethylene, hydrogen sulfide, carbonyl sulfide, air, combustion flue gas, mixtures of methane with ethane, argon, light hydrocarbons, and mixtures thereof, among others.

The method for recovering crude oil from a subterranean formation can also include injecting a drive fluid into the subterranean formation after injection the carbon dioxide and diluent to form the dispersion in the subterranean formation. As used herein, the term "drive fluid" can include a liquid, a gas, a dispersion or a mixture thereof, which is used in enhanced petroleum recovery. Examples of a drive fluid can include, but are not limited to, water, brine, an aqueous solution containing a polymer, a dispersion, a foam, an emulsion and mixtures thereof. Additional examples of the drive fluid can include a gas or a vapor selected from carbon dioxide, $H_2S$, steam, a hydrocarbon-containing gas, an inert gas, air, oxygen and mixtures thereof.

In some embodiments, compositions of the present disclosure can include other additives. For example, the composition can include corrosion inhibitors, antioxidants, co-surfactants, scale inhibitors, mixtures thereof, as well as other additives. In some embodiments, the total amount of the additives added to the compositions of the present disclosure is not greater than about 5 weight percent, based on a total weight of the composition.

In addition to being used in enhanced crude oil recovery, the nonionic surfactants of the present disclosure may also be used in a variety of other areas where it would be desirable to use carbon dioxide as a solvent in a dispersion, a foam or an emulsion. Such areas include, but are not limited to, dry cleaning applications and industrial catalysis. In dry cleaning applications the nonionic surfactant can help form an emulsion of water and supercritical carbon dioxide, which can act as a cleaning solvent. In industrial catalysis, a dispersion, an emulsion or a foam of the nonionic surfactant, supercritical carbon dioxide and a diluent may act as a solvent for the catalyst system, which normally would have required an organic solvent.

It is to be understood that the above description has been made in an illustrative fashion, and not a restrictive one. Although specific embodiments have been illustrated and described herein, those of ordinary skill in the art will appreciate that other component arrangements can be substituted for the specific embodiments shown. The claims are intended to cover such adaptations or variations of various embodiments of the disclosure, except to the extent limited by the prior art.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the disclosure.

Embodiments of the present disclosure are illustrated by the following examples. It is to be understood that the particular examples, materials, amounts, and procedures are to be interpreted broadly in accordance with the scope and spirit of the disclosure as set forth herein.

EXAMPLES

The following examples are given to illustrate, but not limit, the scope of this disclosure. Unless otherwise specified, all instruments and chemicals used are commercially available.

Materials

PRIMENE™ TOA (a highly branched C8 tertiary alkyl primary amine, The Dow Chemical Company).

PRIMENE™ 81-R (a mixture of highly branched C12-C14 tertiary alkyl primary amine isomers, The Dow Chemical Company).

Propylene Oxide (PO, The Dow Chemical Company).

Potassium hydroxide (KOH, Sigma-Aldrich®, St. Louis, Mo.).

Ethylene Oxide (EO, The Dow Chemical Company).

Deionized (DI) water is used throughout from a Nanopure™ II (Barnstead, Dubuque, Iowa) with an average conductance of 16 ohms.

Instrument-grade carbon dioxide (>99.99% pure, Airgas.).

Nonionic Surfactant Synthesis

The following procedure exemplifies a standard procedure for synthesizing the nonionic surfactants of the present disclosure using an alkoxylation reaction of a first epoxide, a second epoxide different than the first epoxide, and a primary aliphatic amine covalently linked to a tertiary carbon of a C4 to C30 branched alkyl monoamine. One skilled in the art will appreciate that this is an exemplary procedure and that other branched alkyl monoamines and/or different amounts of the first epoxide and the second epoxide can be used in the procedure to make the nonionic surfactant of the present disclosure.

Synthesis of Examples 1-8 of the Nonionic Surfactant

Perform the alkoxylation reactions in a jacketed, baffled 9 liter (L) stainless steel autoclave reactor equipped with magnetically driven impeller. Prior to each feed, charge alkylene oxide to a designated feed (DF) tank positioned on a weigh cell. Transfer alkylene oxide from the DF tank to the reactor through a flow meter at the reaction temperature of 110-130° C. Use aqueous (45 wt %) potassium hydroxide as the catalyst and follow with a dehydration step until the water level is less than 500 parts-per-million (ppm). Remove a reactor sample (approximately 200-800 g) after each feed. For those reactor samples catalyzed with KOH, neutralize the sample with magnesium silicate. The specifics of the synthesis are as follows.

Examples 1-8

Prepare Examples 1-4 by a stepwise alkoxylation of PRIMENE™ TOA with the following molar amounts of oxide: 3 moles PO and 8 moles EO (Example 1), 3 moles PO and 12 moles EO (Example 2), 3 moles PO and 16 moles EO (Example 3), and 3 moles PO and 20 moles EO (Example 4). Prepare Examples 5-8 by a stepwise alkoxylation of PRIMENE™ 81-R with the following molar amounts of oxide: 5 moles PO and 10 moles EO (Example 5), 5 moles PO and 14 moles EO (Example 6), 5 moles PO and 18 moles EO (Example 7), and 5 moles PO and 22 moles EO (Example 8).

Form a "PRIMENE™ TOA Amine monopropoxylate" by reacting 1 mole of PRIMENE™ TOA with 1 mole of PO in the presence of added water, but without added catalyst (amine autocatalytic). Prior to the reaction purge the 9 L reactor with nitrogen. Add the PRIMENE™ TOA (1500.5 g) and water (31.0 g) into the nitrogen purged 9 L reactor. Pressurize and vent the reactor with nitrogen seven times to remove atmospheric oxygen, then pressurize with nitrogen to 110.3 KPa to 137.9 KPa at ambient temperature (23° C.). Heat the reactor contents with agitation to 110° C., add 700 grams of PO to the reactor over approximately 6½ hr at 110° C. After the PO feed is complete, agitate the reactor contents at reaction temperature for an additional 2 hours to consume unreacted oxide (digest). After the 2 hours cool the PRIMENE™ TOA Amine monopropoxylate to 80° C. Collect the PRIMENE™ TOA Amine monopropoxylate (2131 g) from the reactor for use in a subsequent reaction.

For the subsequent reaction, charge the reactor with the 1500 g of the PRIMENE™ TOA Amine monopropoxylate and aqueous (45 wt %) potassium hydroxide (22.5 g) and heat the mixture (110° C.) with vacuum and nitrogen sparge for 3 hours, then for an additional 3 hours with nitrogen sparge at atmospheric pressure to dehydrate. The reactor was sampled (222 g) for Karl Fisher analysis and measured 147 parts-per-million (ppm) water. The remaining 1278 g (containing catalyst equivalent to 7822 ppm KOH concentration) was used for the subsequent propoxylation. Pressurize the reactor and vent seven times to remove atmospheric oxygen, then pressurize with nitrogen to 16-20 psia at ambient temperature. Heat the reactor contents with agitation to 125° C. Add 800 grams of PO into the reactor over approximately 2 hours resulting in an operating pressure of 60 psia. After the PO feed is complete, agitate the reactor contents at 125° C. for 9 hours to consume unreacted oxide. Cool the reactor contents (referred to herein as "PRIMENE™ TOA Amine Tripropoxylate") for use in subsequent reactions. The KOH catalyst was not neutralized. Prepare "PRIMENE™ 81-R Amine pentapropoxylate" according to the same procedure used to form "PRIMENE™ TOA Amine Tripropoxylate," except that PRIMENE™ 81-R Amine (2010 g) was used in place of PRIMENE™ TOA and in the first stage of propylene oxide addition, water was not used. In the first stage 655 g of PO was used to synthesize the monopropoxylate, followed by 1850 g of PO to complete the synthesis of the pentapropoxylate. The KOH was again not neutralized.

Example 1

Heat 1748 g of the PRIMENE™ TOA Amine Tripropoxylate (which still contains 8.4 g of KOH) with agitation to 125° C. Add 2010 grams of EO to the reactor over 4 hours resulting in an operating pressure of approximately 60 psia. After the EO feed was complete, the reactor contents were agitated at 125° C. for 6½ hours to consume unreacted oxide, then cooled to 30° C. Remove a portion of the reactor contents (421 g) for neutralization by magnesium silicate. The resulting compound, Example 1, is thus formed with one mole of PRIMENE™ TOA, 3 moles of PO and 8 moles of EO.

Example 2

Heat 3337 grams of the remaining reactor contents from Example 1 (which still contains 7.5 g of KOH) with agitation to 125° C. Add 885 grams of EO into the reactor over 4 hours resulting in an operating pressure of approximately 40 psia. After the EO feed was complete, the reactor contents were agitated at 125° C. for 6 hours to consume unreacted oxide, then cooled to 70° C. Remove a portion of the reactor contents (422 g) for neutralization by magnesium silicate. The resulting compound, Example 2, is thus formed with one mole of PRIMENE™ TOA, 3 moles of PO and 12 moles of EO.

Example 3

Heat 3800 grams of the remaining reactor contents from Example 2 (which still contains 6.7 g of KOH) with agitation to 125° C. Add 790 grams of EO into the reactor over 1 hour resulting in an operating pressure of 50-60 psia. After the EO feed was complete, the reactor contents were agitated at 125° C. for 7 hours to consume unreacted oxide, then cooled to 30° C. Remove a portion of the reactor contents (379 g) for neutralization by magnesium silicate. The resulting compound is Example 3 (formed with one mole of PRIMENE™ TOA, 3 moles of PO and 16 moles of EO).

Example 4

Heat 4211 grams of the remaining reactor contents from Example 3 (which still contains 6.2 g of KOH) with agitation to 125° C. Add 730 grams of EO into the reactor over 2 hours resulting in an operating pressure of 50-60 psia. After the EO feed was complete, the reactor contents were agitated at 125° C. for 3½ hours to consume unreacted oxide, then cooled to 70° C. Neutralize the reactor contents with magnesium silicate (153 g) and water (82 g). Remove the water with vacuum flashing and nitrogen sparging. Filtration afforded 4469 g of Example 4 (formed with one mole of PRIMENE™ TOA, 3 moles of PO and 20 moles of EO).

Example 5

Heat 3161 g of the PRIMENE™ 81-R Amine pentapropoxylate (which still contains 9.0 g of KOH) with agitation to 125° C. Add 2972 grams of EO to the reactor over 4 hours resulting in an operating pressure of approximately 60 psia. After the EO feed was complete, the reactor contents were agitated at 125° C. for 6½ hours to consume unreacted oxide, then cooled to 30° C. Remove a portion of the reactor contents (826 g) for neutralization by magnesium silicate. The resulting compound, Example 5, is thus formed with one mole of PRIMENE™ 81-R, 5 moles of PO and 10 moles of EO.

Example 6

Heat 5307 grams of the remaining reactor contents from Example 5 (which still contains 7.8 g of KOH) with agitation to 125° C. Add 1015 grams of EO into the reactor over 4 hours resulting in an operating pressure of approximately 40 psia. After the EO feed was complete, the reactor contents were agitated at 125° C. for 6 hours to consume unreacted oxide, then cooled to 70° C. Remove a portion of the reactor contents (969 g) for neutralization by magnesium silicate. The resulting compound, Example 6, is thus formed with one mole of PRIMENE™ 81-R, 5 moles of PO and 14 moles of EO.

Example 7

Heat 5353 grams of the remaining reactor contents from Example 6 (which still contains 6.6 g of KOH) with agitation to 125° C. Add 867 grams of ED into the reactor over 1 hour resulting in an operating pressure of 50-60 psia. After the EO feed was complete, the reactor contents were agitated at 125° C. for 7 hours to consume unreacted oxide, then cooled to 30° C. Remove a portion of the reactor contents (853 g) for neutralization by magnesium silicate. The resulting compound is Example 7 (formed with one mole of PRIMENE™ 81-R, 5 moles of PO and 18 moles of EO).

Example 8

Heat 5367 grams of the remaining reactor contents from Example 7 (which still contains 5.7 g of KOH) with agitation to 125° C. Add 750 grains of EO into the reactor over 2 hours resulting in an operating pressure of 50-60 psia. After the EO feed was complete, the reactor contents were agitated at 125° C. for 3½ hours to consume unreacted oxide, then cooled to 70° C. Neutralize the reactor contents with magnesium silicate (117 g) and water (55 g). Remove the water with vacuum flashing and nitrogen sparging. Filtration afforded 4957 g of Example 8 (PRIMENE™ 81-R, 5 moles of PO and 22 moles of EO).

Table I below summarizes Examples 1-8.

TABLE I

Summary for Examples 1-8

| | Target Moles | moles PO by charge | moles EO by charge |
|---|---|---|---|
| Example 1 | C8 + 3PO + 8EO | 3.09 | 8.05 |
| Example 2 | C8 + 3PO + 12EO | 3.09 | 12.05 |
| Example 3 | C8 + 3PO + 16EO | 3.09 | 16.01 |
| Example 4 | C8 + 3PO + 20EO | 3.09 | 20.00 |
| Example 5 | C12 + 5PO + 10EO | 5.05 | 10.05 |
| Example 6 | C12 + 5PO + 14EO | 5.05 | 14.01 |
| Example 7 | C12 + 5PO + 18EO | 5.05 | 18.01 |
| Example 8 | C12 + 5PO + 22EO | 5.05 | 22.02 |

Cloud Point Measurement of Examples 1-4 in Aqueous Solutions

The cloud point is the temperature at which a previously clear, single-phased aqueous solution becomes cloudy due to separation of a second phase. Cloud point measurements are made according to ASTM D2024-09. At the cloud point the cloudiness of the sample lowers the transmittance of light passing through the sample to a detector. Measure the transmittance using a Mettler FP90 Cloud Point System. Calibration is accomplished with benzophenone and/or benzoic acid. Prepare the samples as 10 weight percent surfactant in water. The Cloud Point System gradually increases the temperature (typically 3° C./minute) of the sample from approximately 15° C. below the expected cloud point to 10° C. above the expected cloud point. Set the F factor (light transmittance reduction criterion) at 4%.

Cloud Point Measurement of Examples 1-4 in Super Critical Carbon Dioxide

Cloud point measurements in super critical carbon dioxide were performed with a Temco Pendant drop Interfacial Tension IFT-820-P instrument (Temco, Inc. Tulsa Okla.), which was modified so that the IFT cell can provide measurements of nonionic surfactant solubility in supercritical carbon dioxide (carbon dioxide held at or above its critical temperature and critical pressure) at high pressures (up to 5000 psi) and temperatures (up to 176° C.). The re-engineered cell is referred to herein as a Pressure-Volume-Temperature (PVT) cell. The PVT cell consists of a small pressure vessel (42 mL volume), two heater bands, insulating jackets, and two high-pressure, tempered borosilicate glass windows to facilitate viewing the interior of the cell. A diffuse light source was placed on one window to illuminate the interior of the cell, and a Ramé-Hart video microscope was used on the other window to take pictures of cell interior.

Figure 1:
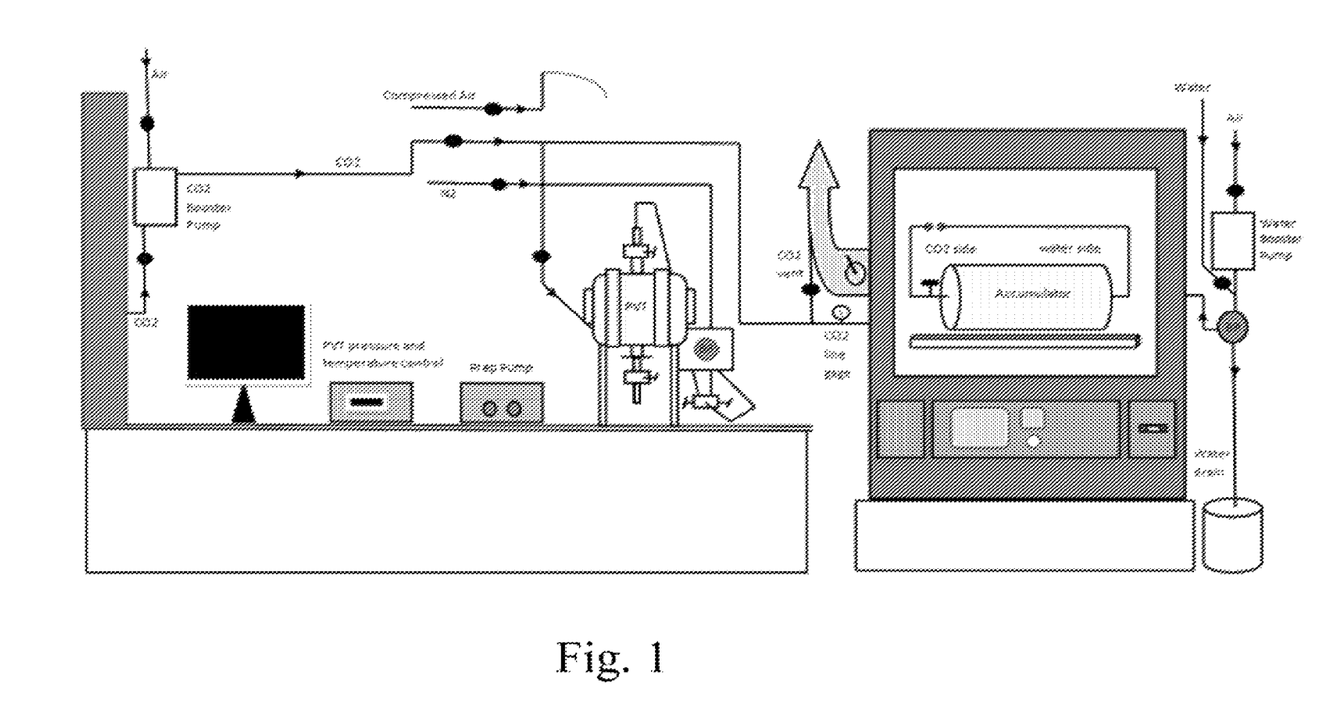
FIG. 1 provides a schematic of a Pressure-Volume-Temperature cell with an accumulator system for measuring cloud point values according to the present disclosure.

Since the PVT cell has a fixed volume, an accumulator was placed (1 liter in volume) in line to the system to vary the pressure inside the PVT cell by pumping fluid to or from the accumulator in to the PVT cell. The accumulator was manufactured at OFT Testing Equipment, Inc. (Houston, Tex.). One side of the accumulator was connected to the PVT cell and was designed to hold liquid carbon dioxide, the other side was plumbed up to DI water. A floating piston separates the two sides. The accumulator was housed inside a Blue M oven, model # DC-256-B-ST350 (Thermal Product Solutions), so the entire accumulator could be heated to the same temperature as the PVT cell. The tubing running from the accumulator to the PVT cell was insulated to prevent heat loss. A Haskel MS-71 air driven liquid pump (Pneumatic and Hydraulic Co., Houston, Tex.) was used to adjust the pressure of the water side of the accumulator, thereby adjusting the pressure inside the PVT cell. A Tescom 6000 psi back pressure regulator (Emerson Process Management) was installed on the water line to regulate the pressure of the water side of the accumulator, and also to function as a relief valve safety device to prevent over-pressurization of the system. Lastly, a liquid carbon dioxide feed line was added to the PVT/accumulator tubing system, with another Haskel MS-71 air driven liquid pump to aid in pumping up the liquid carbon dioxide pressure in the system. The spring inside this MS-71 pump was removed so the pump piston would operate more slowly to avoid flashing carbon dioxide inside the pump cavity. A schematic of the PVT setup with the accumulator system is shown in FIG. 1.

The total volume of the PVT cell, accumulator and all associated tubing was estimated to be approximately 1050 milliliters (mL). The cell and tubing volume was estimated to be about 50 mL, while the accumulator volume was measured to be 1000 mL. For cloud point measurements, the accumulator was filled with 500 mL of liquid carbon dioxide. At 20° C. the density of liquid carbon dioxide is approximately 0.774 g/mL. Thus the total mass of carbon dioxide in the PVT cell system was calculated to about 385 grams; 29.3 grams in the cell, and 355.7 grams in the accumulator. Based on the total mass of carbon dioxide in the cell, the nonionic surfactant of the present disclosure was added to the system at approximately 1000 parts per million (ppm). The requisite amount of the nonionic surfactant (approximately 0.385 g) addition was performed prior to filling the cell and accumulator with carbon dioxide. Out of the 0.385 g, approximately 0.029 g was added in to the PVT cell and 0.356 g was added in to the carbon dioxide side of the accumulator. If the surfactant is solid, it was melted at 50° C. and then added in to the system. Before adding the carbon dioxide, the accumulator was pumped full of water to move the piston over to the carbon dioxide side to "zero" the volume. Surfactant was added to the tubing entering the carbon dioxide side. 500 mL of water was drained from the water side of the accumulator so as to allow 500 mL of liquid carbon dioxide to enter the carbon dioxide side and mix with the surfactant. A Haskel MS-71 carbon dioxide feed pump was used to pressurize the entire system to approximately 2300 psi before closing the carbon dioxide feed line. At this point the system was allowed to equilibrate for a few minutes to allow the surfactant to diffuse into the carbon dioxide phase, and for the carbon dioxide to permeate into all the o-rings throughout the system.

The cell and oven temperatures were set at the lowest starting test temperature (usually 40° C.) and the Haskel MS-71 water pump was used to increase the system pressure until the interior of the cell was completely clear (usually about 2500 psi). The Ramé-Hart video microscope mounted in front of one borosilicate glass cell window displays the cell interior on a computer screen. Alternately the cell interior could be viewed via a mirror through the same window. The opposite window was equipped with a light source for illuminating the cell interior for the camera.

The system was allowed to equilibrate for approximately 2 hours in this state in order to reach equilibrium at the temperature set point. After equilibration, the Tescom 6000 psi back pressure regulator was used on the water line to slowly decrease the system pressure until the surfactant began to precipitate out of solution. The pressure was recorded at which the first sign of precipitation was observed—this is referred to as the cloud point of the surfactant at the given temperature. Lower cloud point pressures indicate higher carbon dioxide solubility of the nonionic surfactant at the given test temperature.

Cloud Point Pressures

Figure 2:
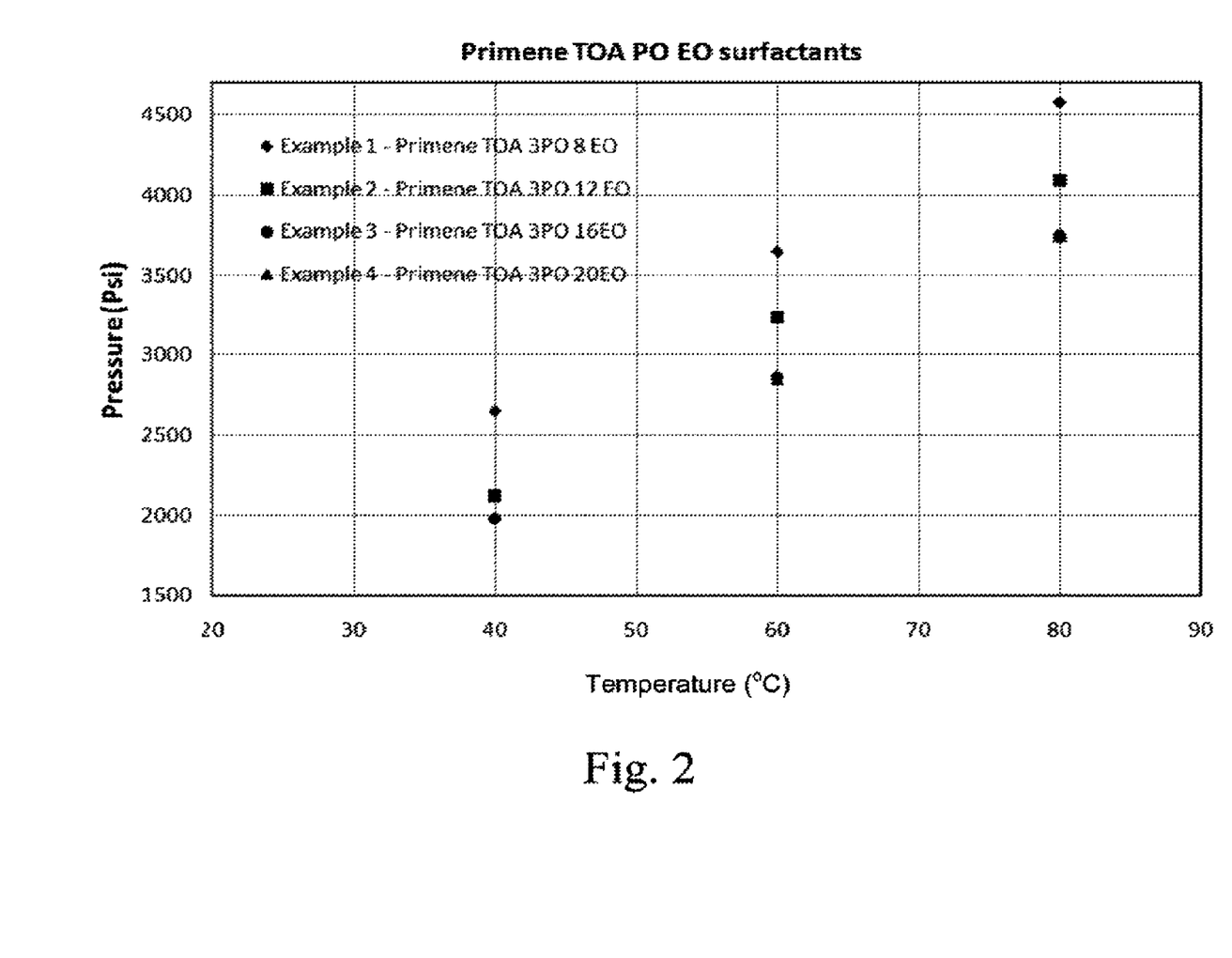
FIG. 2 provides cloud point pressures for Examples of the nonionic surfactant of the present disclosure.

FIG. 2 shows the cloud point pressures of Examples 1-4 of the nonionic surfactant in the supercritical carbon dioxide. Table 1 provides the data plotted in FIG. 2. As illustrated in FIG. 2, the cloud points show the solubility of the nonionic surfactants of Examples 1 through 4 in supercritical carbon dioxide, where above the cloud point pressure for a given temperature the nonionic surfactant is soluble in the supercritical carbon dioxide, whereas at or below the cloud point temperature the nonionic surfactant is insoluble in the supercritical carbon dioxide. As illustrated, the lower the pressure the more soluble the surfactant is in carbon dioxide. In addition, FIG. 2 illustrates that for a given temperature the cloud point pressure decreases as the amount of EO present in the nonionic surfactant increases.

TABLE 1

| Surfactant | Cloud pt at 40° C. (psi) | Cloud pt at 60° C. (psi) | Cloud pt at 80° C. (psi) |
|---|---|---|---|
| Example 1 Primene TOA 3 PO 8 EO | 2650 | 3650 | 4580 |
| Example 2 Primene TOA 3 PO 12 EO | 2120 | 3240 | 4090 |
| Example 3 Primene TOA 3 PO 16 EO | 1980 | 2860 | 3745 |
| Example 4 Primene TOA 3 PO 20 EO | NA | 2850 | 3750 |

Table 2 provides data on the solubility of the nonionic surfactants of Examples 1-4 in water and a brine solution (e.g., aqueous solutions) of different salt concentrations (where the % NaCl is a weight percent of the total solution). As the data indicates, the amount of EO present on the nonionic surfactant of the present disclosure can also have an influence on how soluble the nonionic surfactant will be in water and the brine solution. When enough EO is present on the nonionic surfactant, the nonionic surfactant will be soluble in the water or brine solution. When salt is present in the water (the brine solution), the cloud point temperature is reduced (i.e., the surfactant is less soluble for a given temperature as the concentration of salt goes up).

TABLE 2

| Nonionic Surfactant | General Composition | Conc (wt. %) | Solution Composition | Cloud point ° C. |
|---|---|---|---|---|
| Example 1 | Primene C8—3PO—8EO | 1 | water | 68.27 |
| Example 1 | Primene C8—3PO—8EO | 1 | 1 wt. % NaCl | 65.03 |
| Example 1 | Primene C8—3PO—8EO | 1 | 5 wt. % NaCl | 55.30 |
| Example 1 | Primene C8—3PO—8EO | 1 | 10 wt. % NaCl | 44.70 |
| Example 2 | Primene C8—3PO—12EO | 1 | water | 88.17 |
| Example 2 | Primene C8—3PO—12EO | 1 | 1 wt. % NaCl | 83.93 |
| Example 2 | Primene C8—3PO—12EO | 1 | 5 wt. % NaCl | 71.53 |
| Example 2 | Primene C8—3PO—12EO | 1 | 10 wt. % NaCl | 59.07 |
| Example 3 | Primene C8—3PO—16EO | 1 | water | 99.53 |
| Example 3 | Primene C8—3PO—16EO | 1 | 1 wt. % NaCl | 94.53 |
| Example 3 | Primene C8—3PO—16EO | 1 | 5 wt. % NaCl | 80.60 |
| Example 3 | Primene C8—3PO—16EO | 1 | 10 wt. % NaCl | 66.97 |
| Example 4 | Primene C8—3PO—20EO | 1 | water | 106.30 |
| Example 4 | Primene C8—3PO—20EO | 1 | 1 wt. % NaCl | 99.43 |
| Example 4 | Primene C8—3PO—20EO | 1 | 5 wt. % NaCl | 84.40 |
| Example 4 | Primene C8—3PO—20EO | 1 | 10 wt. % NaCl | 70.50 |

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the claims reflect, inventive subject matter lies in less than all features of a single disclosed embodiment. Thus, the claims are hereby incorporated into the Detailed Description, with each claim standing on its own as a separate embodiment of the disclosure.

We claim:

1. A dispersion for enhanced crude oil recovery, comprising:
   carbon dioxide in a liquid or a super critical state;
   a diluent selected from the group consisting of water, brine, connate water, surface water, distilled water, carbonated water, sea water and combinations thereof; and
   a nonionic surfactant provided by a reaction product of an alkoxylation reaction of a primary aliphatic amine with propylene oxide followed by ethylene oxide, wherein the primary aliphatic amine is selected from a tertiary butylamine, a branched C8 tertiary alkyl primary amine, a mixture of branched C16 to C33 tertiary alkyl primary amine isomers and a mixture of branched C12 to C14 tertiary alkyl primary amine isomers, where the nonionic surfactant is formed with a molar ratio of propylene oxide to the branched alkyl monoamine in a range of 1.5:1.0 moles to 10:1.0 moles and a molar ratio of ethylene oxide to branched alkyl monoamine in a range of 3.0:1.0 moles to 40.0:1.0 moles.

2. The dispersion for enhanced crude oil recovery of claim 1, where the branched alkyl monoamine is a branched C8 tertiary alkyl primary amine.

3. The dispersion for enhanced crude oil recovery of claim 1, where the branched alkyl monoamine is a mixture of branched C12 to C14 tertiary alkyl primary amine isomers.

4. The dispersion for enhanced crude oil recovery of claim 1, where the alkoxylation reaction has a molar ratio of propylene oxide to branched alkyl monoamine in a range of 1.5:1.0 moles to 10:1.0 moles.

5. The dispersion for enhanced crude oil recovery of claim 1, where the the alkoxylation reaction has a molar ratio of ethylene oxide to branched alkyl monoamine in a range of 3.0:1.0 moles to 40.0:1.0 moles.

6. The dispersion for enhanced crude oil recovery of claim 5, where the alkoxylation reaction uses a molar ratio of ethylene oxide to branched alkyl monoamine of 12.0:1.0 moles.

7. The dispersion for enhanced crude oil recovery of claim 5, where the alkoxylation reaction uses a molar ratio of ethylene oxide to branched alkyl monoamine of 16.0:1.0 moles.

8. A method for recovering crude oil from a subterranean formation that is penetrated by at least one injection well and one production well, comprising:

forming a dispersion of carbon dioxide and a diluent in the subterranean formation with a nonionic surfactant, the nonionic surfactant provided by a reaction product of an alkoxylation reaction of primary aliphatic amine with propylene oxide followed by ethylene oxide, wherein the primary aliphatic amine is selected from a tertiary butylamine, a branched C8 tertiary alkyl primary amine, a mixture of branched C16 to C33 tertiary alkyl primary amine isomers and a mixture of branched C12 to C14 tertiary alkyl primary amine isomers, where the nonionic surfactant is formed with a molar ratio of propylene oxide to the branched alkyl monoamine in a range of 1.5:1.0 moles to 10:1.0 moles and a molar ratio of ethylene oxide to branched alkyl monoamine in a range of 3.0:1.0 moles to 40.0:1.0 moles, wherein the diluent is selected from the group consisting of water, brine, connate water, surface water, distilled water, carbonated water, sea water and combinations thereof; and recovering crude oil from the subterranean formation from a production well.

9. The method of claim 8, where forming the dispersion includes injecting the nonionic surfactant with water into the subterranean formation via the injection well.

10. The method of claim 9, where injecting the nonionic surfactant with water into the subterranean formation includes injecting carbon dioxide into the subterranean formation after injecting the nonionic surfactant with water into the subterranean formation.

11. The method of claim 1, wherein the molar ratio of propylene oxide to the branched alkyl monoamine is in a range of 3.0:1.0 moles to 10:1.0 moles.

12. The method of claim 1, wherein the molar ratio of propylene oxide to the branched alkyl monoamine is in a range of 5.0:1.0 moles to 10:1.0 moles.

13. The method of claim 1, wherein the molar ratio of propylene oxide to the branched alkyl monoamine is in a range of 3.0:1.0 moles to 5.0:1.0 moles.

14. The method of claim 1, wherein the molar ratio of ethylene oxide to branched alkyl monoamine is in a range of 8.0:1.0 moles to 40.0:1.0 moles.

15. The method of claim 1, wherein the molar ratio of ethylene oxide to branched alkyl monoamine is in a range of 8.0:1.0 moles to 22.0:1.0 moles.

16. The method of claim 1, wherein the molar ratio of ethylene oxide to branched alkyl monoamine is in a range of 12.0:1.0 moles to 22.0:1.0 moles.

* * * * *